Figures 1, 2:
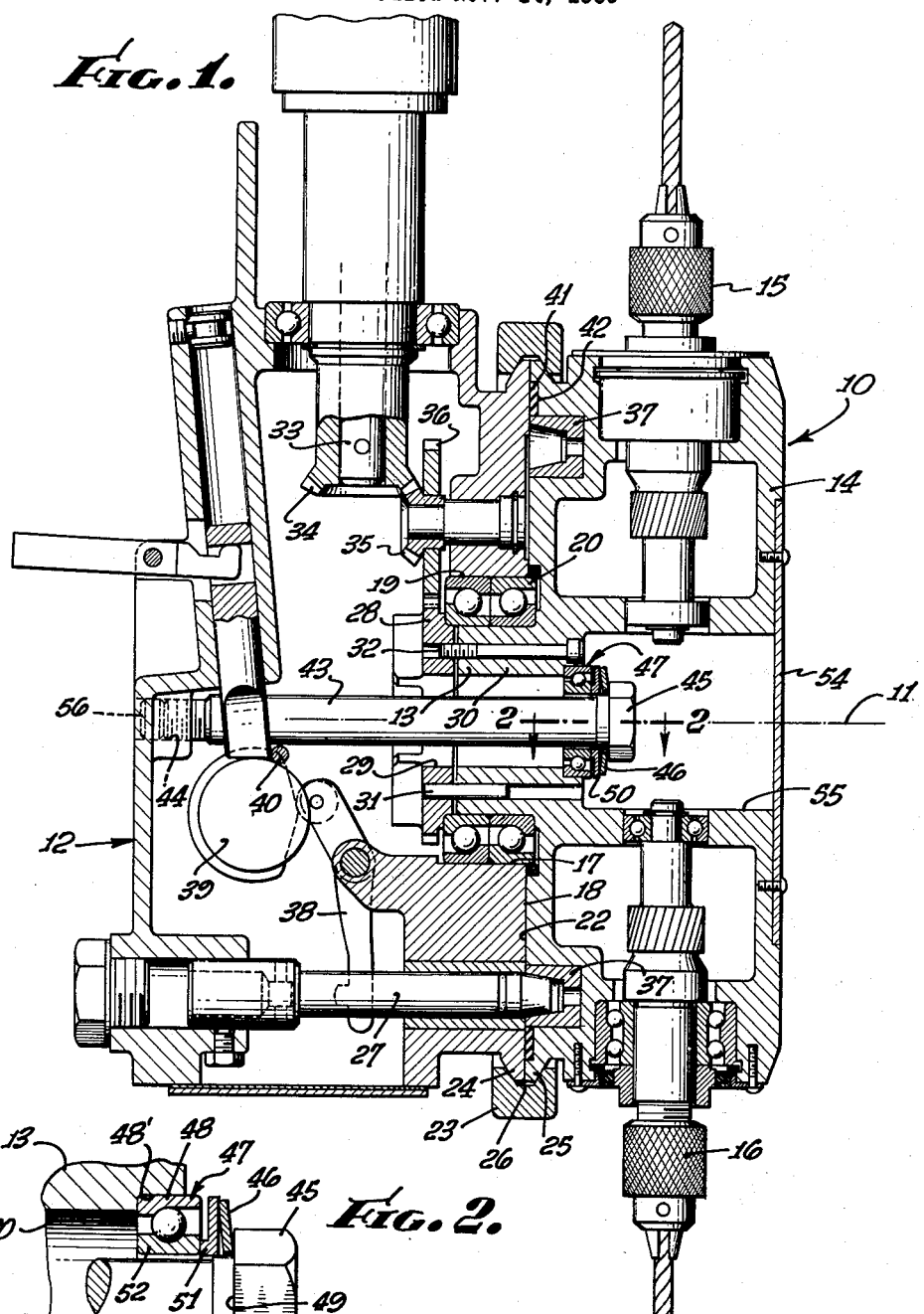

Dec. 24, 1963 J. L. BURG 3,115,051
SPRING-PRESSED TURRET HEAD
Filed Nov. 14, 1960

INVENTOR.
JOSEPH L. BURG
BY
Flam and Flam
ATTORNEYS.

United States Patent Office 3,115,051
Patented Dec. 24, 1963

3,115,051
SPRING-PRESSED TURRET HEAD
Joseph L. Burg, Los Angeles, Calif., assignor, by mesne assignments, to Burgmaster Corporation, Los Angeles, Calif., a corporation of California
Filed Nov. 14, 1960, Ser. No. 68,979
5 Claims. (Cl. 77—25)

This invention relates to machine tools and particularly to machine tools of a type having a turret head for mounting a plurality of tools. Tools of this general description are described, for example, in a Patent No. 2,670,636 issued March 2, 1954, to Fred G. Burg, and entitled Machine Tool of the Drill Press Type Having Multiple Rotary Tools.

It is essential, of course, that the indexing movement of the turret upon which cutting tools are mounted be very accurately controlled. It is furthermore important in order to expedite manufacturing processes that the indexing movement be accomplished quickly. Thus, a turret head, together with its possibly massive mounted tools, must start and stop quickly. There is, therefore, a problem of absorbing impact. An intermittent indexing mechanism, such as a Geneva movement, may be made sufficiently sturdy to absorb the impact. Nevertheless, there is a substantial hammering action between the parts. The substantial hammering action is due to the fact that the intermittent indexing mechanism and the turret head are inertia coupled. That is, the stopping of the indexing mechanism normally results in the imposition of an impact due to the inertia of the turret head. The turret head, furthermore, tends to oscillate or chatter within the limits inherent in the intermittent drive mechanism. All this is objectionable, not only for the noise incident to such hammering and chattering, but for the wear and damage to the interengaging parts. Such wear and damage may ultimately result in a severe loss of tolerance in the angular position of the cutting tools carried by the turret head. The problem, of course, is magnified when relatively heavy tools are mounted on the turret head.

An object of this invention is to overcome these disadvantages and eliminate the hammering and chattering of rapidly indexing turret heads or the like.

Another object of this invention is to overcome these disadvantages by the provision of a simple damping structure in the form of a friction device. Another object of this invention is to provide frictional damping for a rapidly indexing turret head whereby the frictional force may be adjusted for varying loads.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is an axial sectional view of a turret head together with its support embodying the present invention; and FIG. 2 is an enlarged fragmentary sectional view, taken along a plane corresponding to line 2—2 of FIG. 1.

In FIG. 1 there is illustrated a turret head 10 mounted for angular indexing movement about an axis 11, by the aid of a support 12. The head 10 and the support 12 are both made generally as hollow castings. The head 10 has an apertured hub 13 and a hollow flange 14 generally radiating from the hub on one side. Mounted peripherally about the flange 14 are various tool holders 15, 16, etc.

The hub 13 is mounted at a recess 17 of the support 12 that extends to the hollow interior of the support and inwardly of a concentric exteriorly exposed circular flat surface 18. In the present instance the hub 13 fits within a pair of stacked ball bearing structures 19 and 20 that are in turn mounted in the support recess 17. The head flange 14 has an exteriorly exposed generally circular surface 22 that may be held at the support surface 18 in order definitely to determine the angular orientation of the head 10 and the operative tool holder. For this purpose, a split clamping ring 23 is provided. The clamping ring 23 cooperates with companion tapered rims 24 and 25 of the support and head respectively. The tapered rims 24 and 25 fit within a converging interior groove 26 of the clamping ring 23. As the clamping ring 23 is constricted, a reaction is imposed upon the companion rims 24 and 25 to draw them firmly together. The ring 23 is automatically released and reapplied just before and just after each indexing movement of the head.

When the turret head 10 is to be indexed, a centering pin 27, to be hereinafter described, is retracted. A Geneva wheel 28 affixed to the inner end of the hub 13 serves as a means whereby the head 10 is indexed. The Geneva wheel 28 has a central aperture 29 that registers with a central aperture 30 of the hub 13. A coupling between the Geneva wheel 28 and the hub 13 is provided by one or more coupling pins 31 entering registering apertures of the respective parts. One or more cap screws 32 carried by the hub 13 engage suitable threaded apertures of the Geneva wheel 28 which clamps the inner races of the bearings 19 and 20 against the base of the hub 13.

A shaft 33 for positioning a depth stop is synchronized with the head 10. The Geneva wheel 28 has peripherally formed gear teeth that cooperate with a suitable train of gears 34, 35 and 36 for this purpose.

The Geneva wheel 28 may be operated by a one revolution device, the selective operation of which is correlated with the desired turret head position. The Geneva wheel 28 in a well-understood manner, quite accurately moves the head 10 through the prescribed angle. Indexing movement of the turret head 10 may be accomplished by any appropriate means. The Geneva wheel is merely one example.

The turret head 10 mounts a number of cup-like inserts 37 equiangularly about the surface 22, the number of inserts corresponding to the number of tool holders. Each of the inserts 37 provides an outwardly diverging conical seat 38 that upon registry, receives the conical end of the pin 27 mounted on the support 12. By virtue of the interaction of the support mounted pin 27 and any one of the seats of the inserts 37, the position of the turret head 14 is more accurately determined.

The pin 27 by the aid of a rocker arm 38, a cam 39, a one revolution stop 40, and an associated trip mechanism, is retracted prior to indexing movement of the turret head 10, and advanced as soon as the indexing movement is completed. Structures for accomplishing functions such as these are described in said prior patent.

In order to prevent vibration or chattering and hammering of parts, and to ensure smooth operation, a yielding frictional coupling is established and maintained between the head 10 and the support 12 at all times. Thus when the Geneva wheel 28 ceases its rotation, the friction coupling is effective to retard further motion of the head. To accomplish this purpose a friction ring 41 is provided. This ring is generally in the form of a flat annulus and is accommodated in a shallow groove 42 in the face 22 of the head. It normally protrudes beyond the face for engagement with the flat surface 18 of the support 12.

The ring 41 may be made of a variety of materials having adequate friction and wear resisting characteristics. The groove 42 in which the ring 41 is accommodated is located just within the tapered rim, thereby to act at a substantial radius relative to the axis 11. The damping torque per unit of area is thus maximized.

The friction ring 41 is urged into contact with the support surface 18 by imposing upon the head 10 a yielding spring pressure directed to the left and parallel to the axis 11. For this purpose there is provided a post 43 that projects through the aligned apertures 29 and 30 of the Geneva wheel 28 and head hub 13 and across the hollow support 12. The left hand end of the post is threadedly accommodated in an aperture 44 at the left hand wall of the support 12. The opposite end of the post 43 has a hexagonal or other suitable head 45. Behind the head 45 a spring washer 46 is accommodated (FIG. 2) that reacts against the hub 13 and the head 45.

In order to transfer the force of the spring 46 to the hub 13 despite relative angular movement of the post 43 and the head hub 13, a ball bearing structure 47 is provided. The outer race 48 of the bearing 47 is seated in a recess 48′ formed as an enlargement at the right hand end of the hub bore 30. The washer 46 at its inner area reacts against the shoulder 49 formed by the head 45. Its outer area acts against a coupling ring 50. The coupling ring 50 has a central rim 51 aligned with the inner race 52 of the bearing 47. Accordingly, the spring washer 46 acts through the coupling ring 50 and the non-rotary bearing part 52, the balls 53 of the bearing, and the rotary bearing part 48 to urge the hub 13 and the head 10 toward the left and toward the support 12. The friction ring 41 thus is forced against the surface 18.

The force exerted by the spring washer 46 may be adjusted by moving the post 43 axially to reposition the shoulder 49. For this purpose the post 43 may be threaded more or less into the support aperture 44. A removable plate 54 covers an access aperture 55 within the head flange 14 for suitable manipulation of the post 43. A headless set screw 56 accommodated in the outer end of the aperture 44 serves as a means for locking the post 43 in position.

The inventor claims:

1. In a machine tool having a turret head member, a support member mounting the turret head member for angular movement about an axis fixed with respect to the support member, a plurality of tool holders angularly arrayed about the head member, and positive drive means inertia coupled to the turret head member for indexing the turret head member, the combination therewith of friction damping means between the members and in engagement with both of the members as the members are moved angularly with respect to each other to impose a torque drag between the members for minimizing hammering occasioned by the quick starting and stopping of the turret head member.

2. In a machine tool: a support member; a turret head member mounted on the support member for angular movement about an axis determined by the support member, said turret head member having provisions for holding tools in angularly arrayed relationship; positive index drive means inertia coupled to the head member for positioning the turret head member; friction means carried by one of the members and bearing against the other of the members throughout the course of indexing movement; and spring tension means urging the members together to provide a torque coupling between said members via said friction means during indexing movement of said turret head.

3. In a machine tool: a support having a circular surface, and a recess extending inwardly the circular surface; a turret head having a hollow hub received in the recess; means supporting the hub at the recess for angular movement; a friction ring carried by the turret head and continuously contacting said circular surface; a post carried by the support and accessible at the center of the hub; a bearing having relatively rotary parts, one of the parts being secured to the turret head; a spring interposed between the post and the other of the bearing parts for urging the friction ring toward said surface; and positive index drive means for moving the turret head, and inertia coupled to said turret head.

4. In a machine tool: a hollow support having an exterior surface surrounding an aperture; a turret head having a hollow hub projecting into said aperture; means supporting the hub for angular movement of the turret head about the axis of the hub; said turret head having provisions for supporting a series of tools in angularly spaced relationship about said axis; a post carried by the support and having a head projecting through the hub; a spring ring on the post and seated at the head; a bearing having an outer race secured to the turret head, and having an inner race engaged by the spring ring for urging the head toward the support; a friction ring interposed between the head and the support and continuously engaging both the head and the support during angular movement of the turret head; and positive drive means for indexing the turret head and inertia coupled to said turret head.

5. The combination as set forth in claim 4 in which said post is adjustably secured to the support for determining the position of the head, which forms a seat for the spring, relative to the support.

References Cited in the file of this patent

UNITED STATES PATENTS

| | | |
|---|---|---|
| 2,394,769 | Heckethorn | Feb. 12, 1946 |
| 2,505,684 | McClernon | Apr. 25, 1950 |
| 2,527,871 | Bakewell | Oct. 31, 1950 |
| 2,639,195 | Bock | May 19, 1953 |
| 2,682,935 | Blough | July 6, 1954 |
| 2,767,598 | Burg | Oct. 23, 1956 |
| 2,931,464 | Zwick | Apr. 5, 1960 |